(12) United States Patent
Tomoda

(10) Patent No.: US 10,133,706 B2
(45) Date of Patent: Nov. 20, 2018

(54) ELECTRONIC BOOK SYSTEM, ELECTRONIC BOOK PROVISION METHOD, RECORDING MEDIUM, AND PROGRAM

(71) Applicant: Rakuten, Inc., Tokyo (JP)

(72) Inventor: Kazuhiro Tomoda, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 400 days.

(21) Appl. No.: 14/758,976

(22) PCT Filed: Aug. 26, 2013

(86) PCT No.: PCT/JP2013/072742
§ 371 (c)(1),
(2) Date: Jul. 2, 2015

(87) PCT Pub. No.: WO2015/029115
PCT Pub. Date: Mar. 5, 2015

(65) Prior Publication Data
US 2015/0356059 A1    Dec. 10, 2015

(51) Int. Cl.
*G06F 17/00* (2006.01)
*G06F 17/21* (2006.01)
(Continued)

(52) U.S. Cl.
CPC .......... *G06F 17/212* (2013.01); *G06F 3/0483* (2013.01); *G06Q 20/123* (2013.01); *G06Q 30/0242* (2013.01); *G06Q 30/0277* (2013.01); *G06Q 30/06* (2013.01); *G06F 17/2235* (2013.01)

(58) Field of Classification Search
CPC ....... G06F 17/21; G06F 17/212; G06F 3/0483
See application file for complete search history.

(56) References Cited

U.S. PATENT DOCUMENTS

| 6,988,241 B1 * | 1/2006 | Guttman | G06F 17/246 |
| | | | 707/E17.115 |
| 7,509,270 B1 * | 3/2009 | Hendricks | G06Q 30/02 |
| | | | 705/26.9 |

(Continued)

FOREIGN PATENT DOCUMENTS

| JP | 2000-113050 A | 4/2000 |
| JP | 2007-52755 A | 3/2007 |

(Continued)

OTHER PUBLICATIONS

International Search Report for PCT/JP2013/072742 dated Oct. 1, 2013.

*Primary Examiner* — Stephen S Hong
*Assistant Examiner* — Marshon L Robinson
(74) *Attorney, Agent, or Firm* — Sughrue Mion, PLLC

(57) ABSTRACT

In an electronic book system 1 distributing electronic books to browsing devices 30A, 30B, and 30C via a communication network 50, the acquirer of a distribution server 20 acquires the context of operation by a first user who is provided with first candidate pages contained in an electronic book in a previewable manner. The designator of the distribution server 20 designates second candidate pages based on the context of operation acquired by the acquirer and the first candidate pages. The provider provides the second candidate pages designated by the designator to a second user in a previewable manner.

16 Claims, 7 Drawing Sheets

(51) Int. Cl.
*G06F 3/0483* (2013.01)
*G06Q 30/02* (2012.01)
*G06Q 20/12* (2012.01)
*G06Q 30/06* (2012.01)
*G06F 17/22* (2006.01)

(56) References Cited

U.S. PATENT DOCUMENTS

| | | | | |
|---|---|---|---|---|
| 9,268,858 B1* | 2/2016 | Yacoub | ............ | G06F 17/30525 |
| 2003/0018543 A1* | 1/2003 | Alger | .................... | G06Q 30/06 |
| | | | | 705/26.1 |
| 2003/0093312 A1* | 5/2003 | Ukita | .................... | G06Q 30/02 |
| | | | | 705/7.29 |
| 2005/0050088 A1* | 3/2005 | Kotler | ................... | G06F 17/245 |
| 2005/0055626 A1* | 3/2005 | Kotler | ................... | G06F 17/245 |
| | | | | 715/209 |
| 2007/0233811 A1* | 10/2007 | Rochelle | .............. | G06F 17/246 |
| | | | | 709/219 |
| 2009/0117846 A1* | 5/2009 | Mavrakakis | ........... | H04N 5/765 |
| | | | | 455/3.06 |
| 2009/0248535 A1* | 10/2009 | Fisher | ............. | G06Q 30/0601 |
| | | | | 705/26.1 |
| 2011/0153464 A1* | 6/2011 | Hendricks | ............. | G06F 1/1626 |
| | | | | 705/27.1 |
| 2011/0276680 A1* | 11/2011 | Rimon | ............... | H04N 21/2543 |
| | | | | 709/224 |
| 2012/0311438 A1* | 12/2012 | Cranfill | ............. | G06F 17/30011 |
| | | | | 715/256 |
| 2013/0104028 A1* | 4/2013 | Murray | ............ | G06F 15/0291 |
| | | | | 715/234 |
| 2014/0052741 A1* | 2/2014 | Yoshida | ............ | G06F 17/30067 |
| | | | | 707/749 |
| 2014/0115449 A1* | 4/2014 | Migos | ................ | G06F 17/2229 |
| | | | | 715/251 |
| 2014/0310729 A1* | 10/2014 | Chaniotakis | ............. | G09B 5/08 |
| | | | | 719/328 |
| 2015/0039475 A1* | 2/2015 | Sterling | ............. | G06Q 30/0625 |
| | | | | 705/26.62 |
| 2015/0378560 A1* | 12/2015 | Wu | ........................ | G06F 21/10 |
| | | | | 715/764 |
| 2016/0275192 A1* | 9/2016 | Miao | ................. | G06F 17/30867 |

FOREIGN PATENT DOCUMENTS

| | | |
|---|---|---|
| JP | 2010-134854 A | 6/2010 |
| JP | 2012-137840 A | 7/2012 |
| JP | 2013-103816 A | 5/2013 |
| JP | 2013-103817 A | 5/2013 |
| JP | 2013-109653 A | 6/2013 |

* cited by examiner

FIG.4

TABLE OF CONTENTS

INTRODUCTION TO PATENT LAW

|  |  | PAGE |
|---|---|---|
| 401A | CHAPTER 1 PATENT AND PATENT APPLICATION | 5 |
| 401B | CHAPTER 2 EXAMINATION | 80 |
| 401C | CHAPTER 3 PUBLICATION OF APPLICATION | 137 |
| 401D | CHAPTER 4 PATENT RIGHT | 178 |
| 401E | CHAPTER 5 APPEAL TRIAL | 235 |

| USER ID | PREVIEWED PAGE | ENLARGE OR SHRINK | LENGTH OF PREVIEW TIME | PURCHASE |
|---|---|---|---|---|
| ABCD | 5 | × | LESS THAN 1 MUNUTE | × |
| ABCD | 6 | × | LESS THAN 1 MUNUTE | × |
| ABCD | 7 | ○ | 2 MINUTES | ○ |
| ... | ... | ... | ... | ... |
| EFGH | 235 | × | 1 MINUTE | × |
| EFGH | 236 | × | 2 MINUTES | × |
| ... | ... | ... | ... | ... |
| IJKL | 5 | × | 1 MINUTE | × |
| IJKL | 80 | ○ | 5 MINUTES | × |
| IJKL | 81 | ○ | 6 MINUTES | ○ |
| ... | ... | ... | ... | ... |

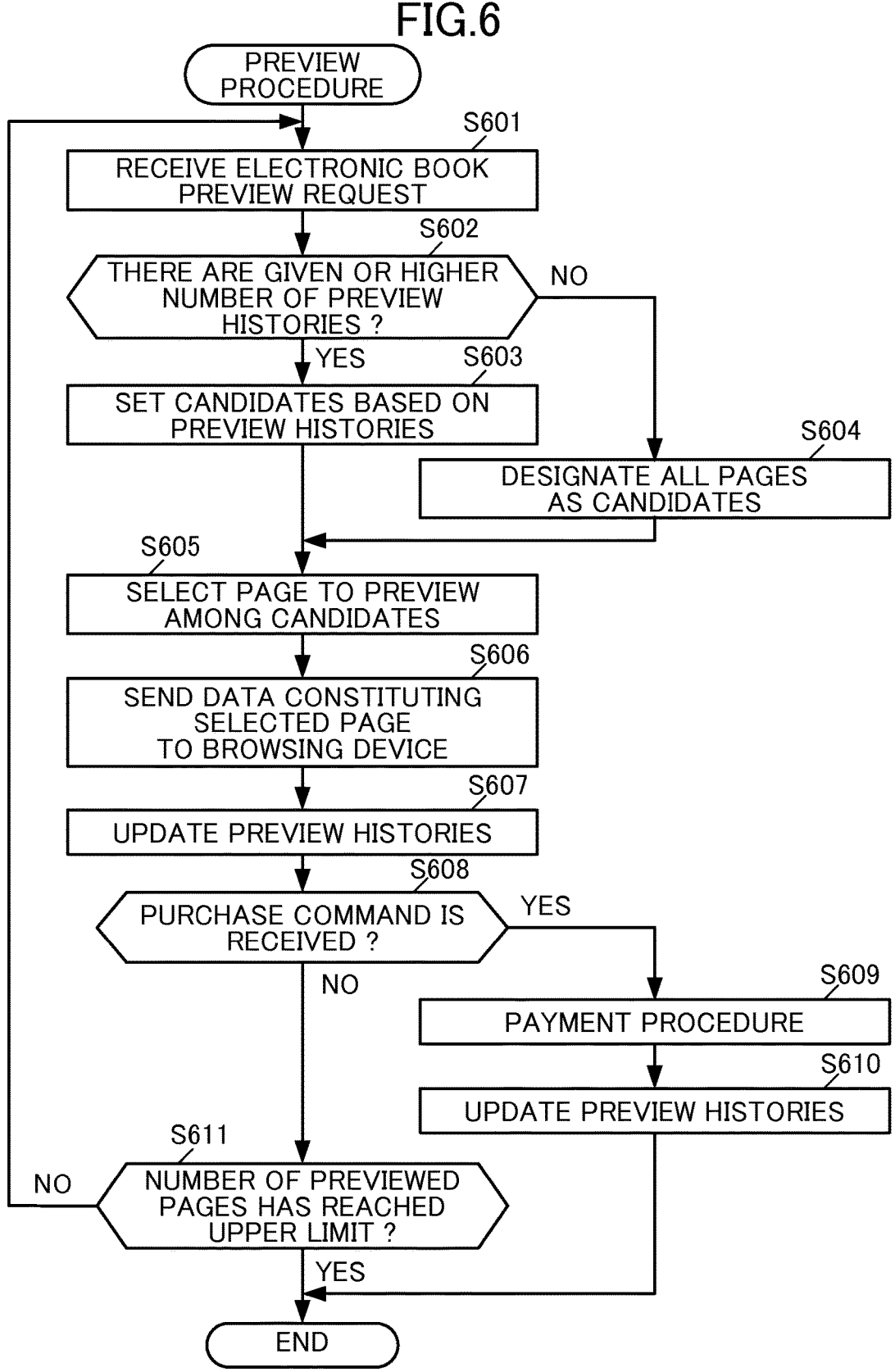

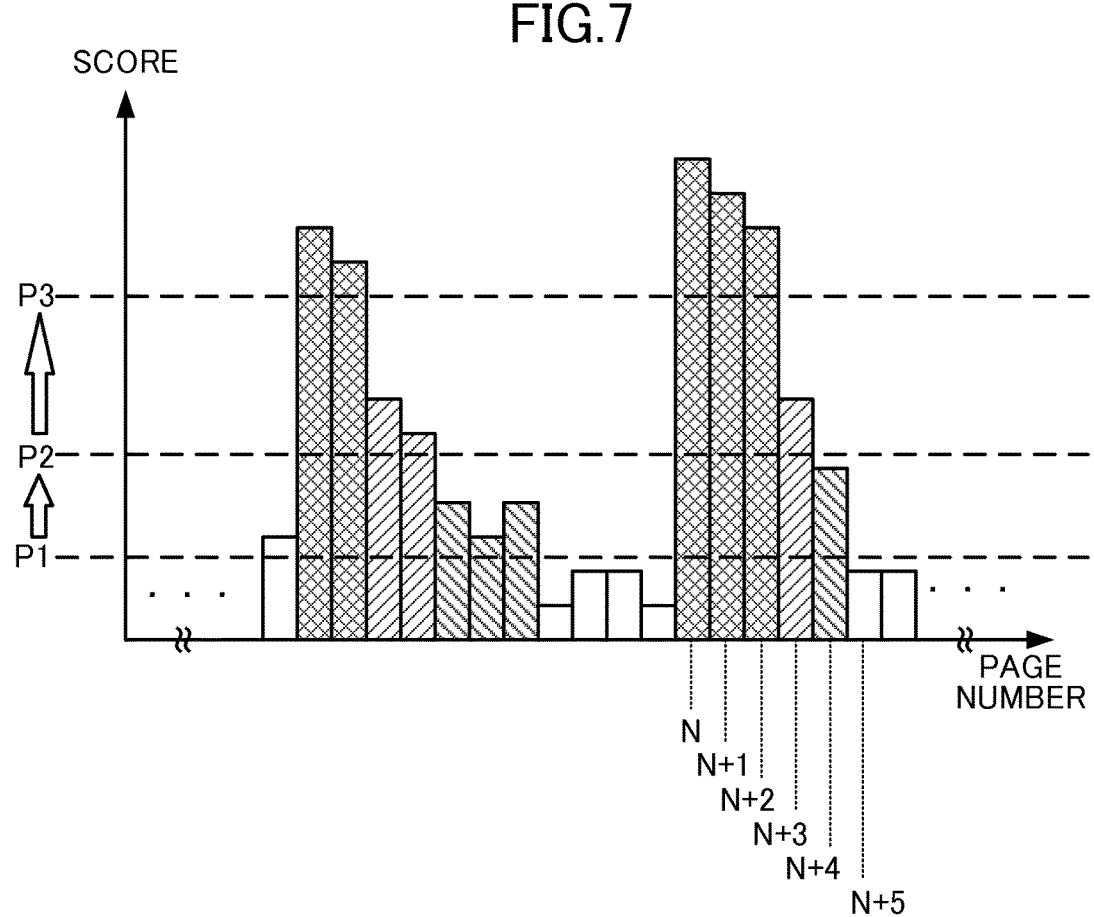

ELECTRONIC BOOK SYSTEM, ELECTRONIC BOOK PROVISION METHOD, RECORDING MEDIUM, AND PROGRAM

CROSS REFERENCE TO RELATED APPLICATIONS

This application is a National Stage of International Application No. PCT/JP2013/072742 filed Aug. 26, 2013, the contents of which are incorporated herein by reference in their entirety.

TECHNICAL FIELD

The present disclosure relates to an electronic book system, electronic book provision method, non-transitory recording medium, and program suitable for providing pages that greatly interest the user previewing the electronic book so as to increase the user's motivation to purchase.

BACKGROUND ART

In recent years, instead of books printed on paper with ink, so-called electronic books, which circulate as digital data via the Internet, have been wide-spread. The users download and view electronic books using a dedicated electronic book reader or a general-purpose portable terminal or personal computer. Electronic books are also called online books or digital books.

For example, Patent Literature 1 discloses a system for updating the contents of advertisements posted in an electronic book containing body text pages and advertisement pages based on the contents the user has browsed and paid attention to.

On the other hand, in a method of selling an electronic book, the user is allowed to preview a portion or shown sample pages of an electronic book before purchase and if he likes it, the user can purchase the electronic book. This is so-called "browsing" of a digital book.

For example, Patent Literature 2 discloses a system for adding data to an electronic book or updating data in an electronic book based on the operation history while sample pages are browsed.

CITATION LIST

Patent Literature

Patent Literature 1: Unexamined Japanese Patent Application Kokai Publication No. 2012-103816; and
Patent Literature 2: Unexamined Japanese Patent Application Kokai Publication No. 2012-103817.

SUMMARY OF INVENTION

Technical Problem

Allowing a user to preview an electronic book before purchase may make the user interested in the book to some extent. However, simply allowing the user to preview pages does not lead to purchase in some cases because the content of the pages do not always induce interest by the previewing user. In light of this, it is demanded to realize an electronic book system that further increases the user's motivation to purchase.

The present disclosure is made with the view of the above situation and an objective of the disclosure is to provide an electronic book system, electronic book provision method, recording medium, and program suitable for providing pages that greatly interest the user previewing the electronic book so as to increase the user's motivation to purchase.

Solution to Problem

The electronic book system according to a first exemplary aspect of the present disclosure comprises:
an acquirer acquiring the context of operation by a first user who is provided with first candidate pages contained in an electronic book in a previewable manner;
a designator designating at least one second candidate page based on the acquired context of operation and the first candidate pages; and
a provider providing the designated second candidate page contained in the electronic book to a second user in a previewable manner.

In the above electronic book system, it is possible that the designator extracts at least one first candidate page from among the first candidate pages based on the acquired context of operation and designates the extracted first candidate page as the second candidate page.

In the above electronic book system, it is possible that the designator designates a table of contents page contained in the electronic book and the first page of each item listed on the table of contents as the second candidate page.

In the above electronic book system, it is possible that the context of operation by the first user includes information presenting whether or not the electronic book is purchased by the first user after the first candidate pages are previewed by the first user, and
the designator designates the page that is previewed immediately before the electronic book is purchased by the first user as the second candidate page.

In the above electronic book system, it is possible that the context of operation by the first user includes information presenting whether or not an operation to zoom in or zoom out is conducted on a page previewed by the first user, and
the designator designates a page on which the operation to zoom in or zoom out has been conducted by the first user as the second candidate page.

In the above electronic book system, it is possible that the context of operation by the first user includes the length of time a page previewed by the first user is displayed, and
the designator designates the page of which the length of display time is relatively longer than the second candidate page.

In the above electronic book system, it is possible that the designator sets an upper limit for the number of pages that the second user is allowed to preview among the designated second candidate pages, and allows to preview of the designated second candidate page when the number of pages previewed by the second user has not reached the upper limit, and does not allow to preview of the designated second candidate page when the number of pages previewed by the second user has reached the upper limit.

In the above electronic book system, it is possible that the electronic book system further comprises a storage storing the acquired context of operation by the first user, and
the designator designates the second candidate page based on the context of operation stored in the storage and the first candidate pages.

In the above electronic book system, it is possible that the designator designates all pages contained in the electronic book as the second candidate page when the number of contexts of operation by the first user stored in the storage is less than a given number, and designates the second candidate page based on the context of operation stored in the storage and the first candidate pages when the number of contexts of operation by the first user stored in the storage is equal to or higher than the given number.

In the above electronic book system, it is possible that the designator designates all pages contained in the electronic book as the second candidate page when the electronic book is previewed within a given time period since the start of selling the electronic book, and designates the second candidate page based on the context of operation stored in the storage and the first candidate pages when the electronic book is previewed after elapse of the given time period.

In the above electronic book system, it is possible that the storage further stores attribute information of the first user, and
the designator designates the second candidate page based on the context of operation by the first user who has attribute information matched with attribute information of the second user and the first candidate pages.

In the above electronic book system, it is possible that the designator calculates a score for each of the first candidate pages based on the context of operation stored in the storage, and designates the second candidate page based on the calculated scores.

In the above electronic book system, it is possible that the designator sets a threshold that is lowered as the number of users who previewed the electronic book increases, and designates pages as many as indicated by the threshold in the descending order of the calculated score from the highest among the first candidate pages as the second candidate page.

In the above electronic book system, it is possible that the acquirer acquires the context of operation by the first user who is provided with the first candidate pages in a first form of previewable manner,
the designator designates a second form based on the acquired context of operation, and
the provider provides the second candidate page to the second user in the designated second form of previewable manner.

An electronic book system according to another exemplary aspect of the present disclosure comprises:
an acquirer acquiring the context of operation by a first user who is provided with candidate pages contained in an electronic book in a first form of previewable manner;
a designator designating a second form based on the acquired context of operation; and
a provider providing the candidate pages contained in the electronic book to a second user in the designated second form of previewable manner,
wherein the first form is higher in clarity than the second form.

An electronic book provision method according to another exemplary aspect of the present disclosure comprises:
an acquisition step of acquiring the context of operation by a first user who is provided with first candidate pages contained in an electronic book in a previewable manner;
a designation step of designating at least one second candidate page based on the acquired context of operation and the first candidate pages; and
a provision step of providing the designated second candidate page contained in the electronic book to a second user in a previewable manner.

A non-transitory recording medium according to another exemplary aspect of the present disclosure stores programs that allow a computer to function as:
an acquirer acquiring the context of operation by a first user who is provided with first candidate pages contained in an electronic book in a previewable manner;
a designator designating at least one second candidate page based on the acquired context of operation and the first candidate pages; and
a provider providing the designated second candidate page contained in the electronic book to a second user in a previewable manner.

A program according to another exemplary aspect of the present disclosure allows a computer to function as:
an acquirer acquiring the context of operation by a first user who is provided with first candidate pages contained in an electronic book in a previewable manner;
a designator designating at least one second candidate page based on the acquired context of operation and the first candidate pages; and
a provider providing the designated second candidate page contained in the electronic book to a second user in a previewable manner.

The above program can be distributed/sold via a computer communication network independently from a computer on which the program runs. Furthermore, the above non-transitory recording medium can be a non-transitory recording medium and distributed/sold independently from the computer.

Advantageous Effects of Invention

The present disclosure can provide pages that presumably the user who previews the electronic book is highly interested in so as to increase the user's motivation to purchase.

BRIEF DESCRIPTION OF DRAWINGS

FIG. 4 is an illustration showing an exemplary display of the table of contents of an electronic book;

FIG. 5 is an illustration showing exemplary histories recorded in the preview histories database;

FIG. 6 is a flowchart for explaining the designation procedure to designate pages that the user is allowed to preview; and FIG. 7 is a chart for explaining how the candidate pages are narrowed down.

DESCRIPTION OF EMBODIMENTS

Embodiments of the present disclosure will be described. The following embodiments are given for the purpose of explanation and do not confine the scope of the present disclosure. Therefore, one of ordinary skill in the art can embrace an embodiment in which some or all components are replaced with equivalent counterparts and such an embodiment falls within the scope of the present disclosure.

Embodiment 1

Figure 1:
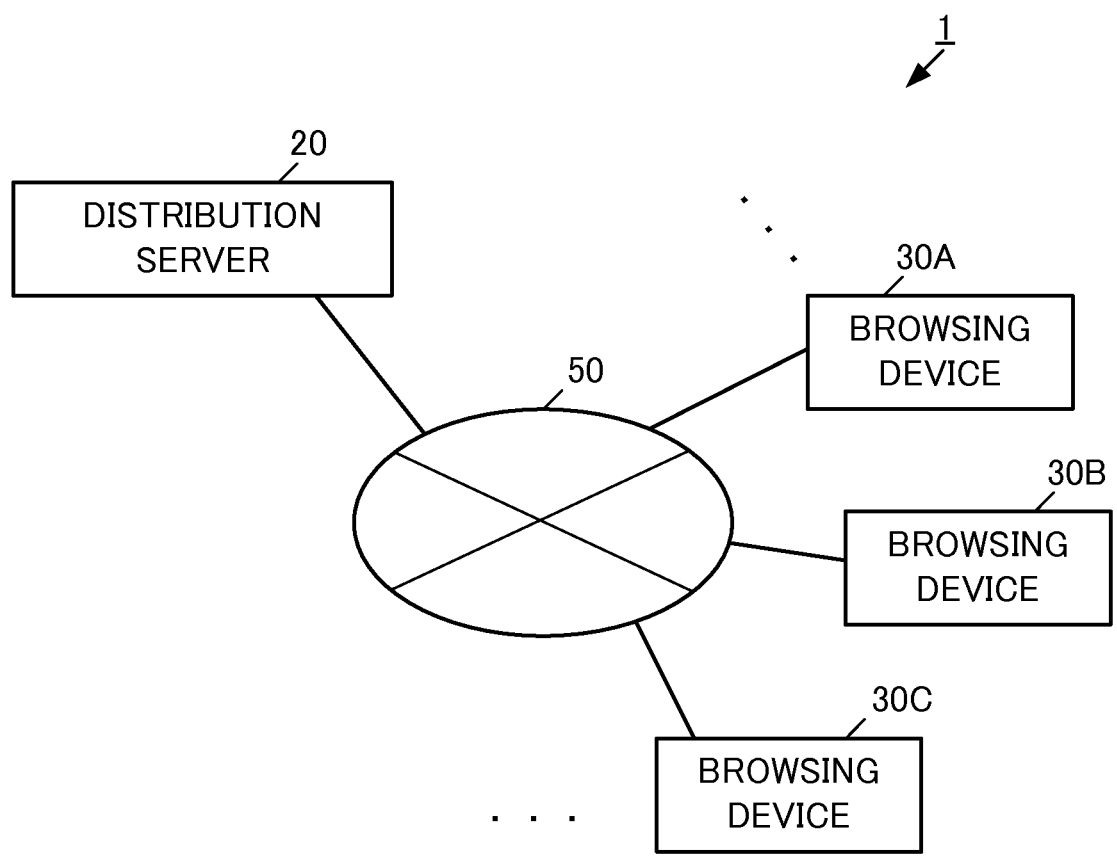
FIG. 1 is a diagram showing the general configuration of the electronic book system according to Embodiment 1 of the present disclosure.

First, the general configuration of an electronic book system 1 of this embodiment will be described using FIG. 1.

The electronic book system 1 comprises a distribution server 20, browsing devices 30 (three browsing devices 30A, 30B, and 30C in FIG. 1) used by the users, and a communication network 50. In this embodiment, the communication network 50 is the Internet.

The distribution server 20 pre-stores data of computerized books such as novels, comics, magazines, and the like ("electronic books" hereafter), and distributes the data to the browsing devices 30 used by the users who have purchased the electronic books. The browsing devices 30 download from the distribution server 20 and reproduce the electronic books the users have purchased based on instructions from the users. The users can purchase and read the desired electronic books via the communication network 50.

Furthermore, the distribution server 20 distributes to the browsing devices 30 a portion of a whole electronic book even if the user has not purchased the electronic book so that a user who has shown interest in but has not purchased the electronic book can preview the electronic book. The browsing device 30 downloads from the distribution server 20 and reproduces a previewable portion of an entire electronic book based on instructions from a user who has not purchased the electronic book. The user can preview the portion for free before purchasing the electronic book. After the preview, the user can purchase the electronic book if he desires to read the entire book. Needless to say, the user can purchase an electronic book without previewing it.

An electronic book comprises multiple pages. An electronic book typically contains, in addition to the body text, a front cover, a table of contents, a prologue, and/or an epilogue. However, it is not essential to contain a front cover, a table of contents, a prologue, or an epilogue.

The pages that the user can preview are often a table of contents and of a prologue. However, a specific portion of the entire body text that induces interest by the user and increases the user's motivation to purchase can be included.

The distribution server 20 of this embodiment designates the pages that the user can preview and allows the user to preview within the designated range. Details will be described later.

The browsing devices 30 are a personal computer, a multifunctional portable phone (so-called smart phone), a tablet-type computer, and an electronic book reader, or the like.

The communication network 50 connects the distribution server 20 and browsing devices 30. The communication network 50 is typically the Internet. However, the communication network 50 can be a telephone lines, a dedicated lines, or a LAN (Local Area Network), or the like.

Figure 2:
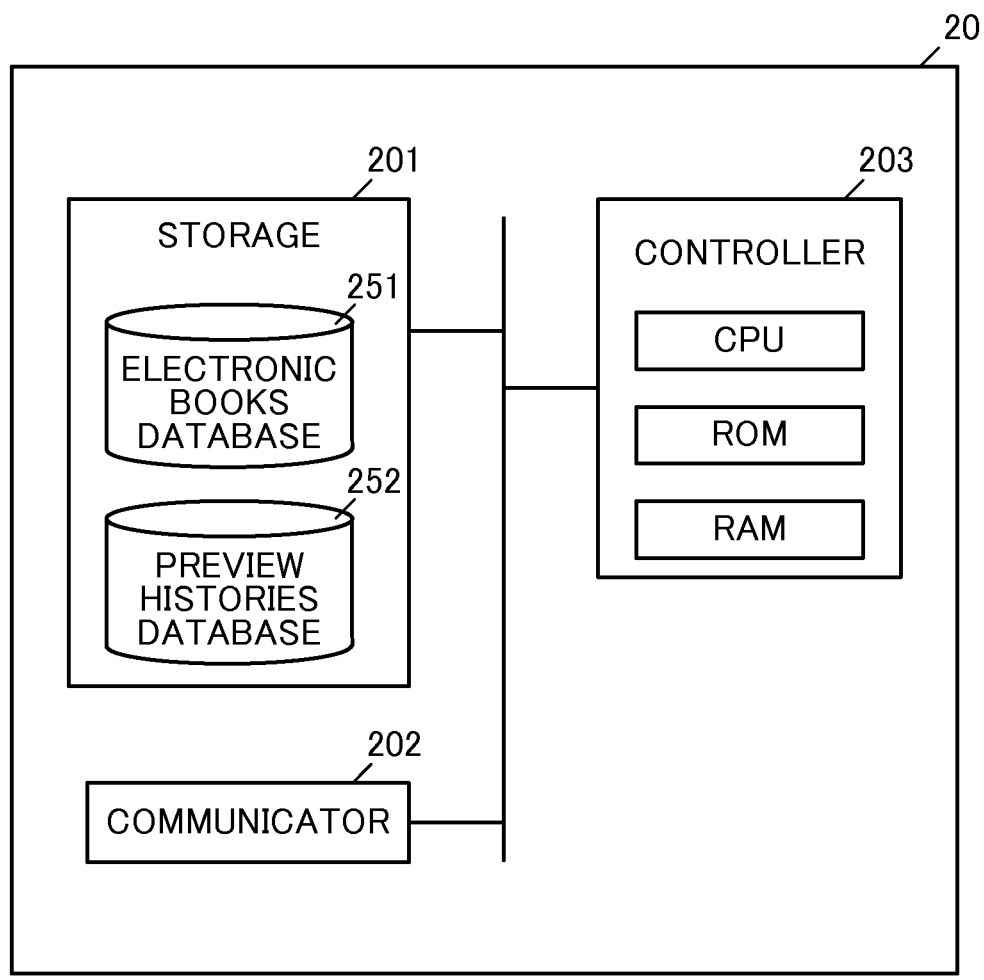
FIG. 2 is a diagram showing the configuration of the distribution server.

The configuration of the distribution server 20 will be described hereafter using FIG. 2. The distribution server 20 comprises a storage 201, a communicator 202, and a controller 203.

The storage 201 comprises a storage device such as a hard disk. The storage 201 stores an electronic books database 251. The electronic books database 251 pre-stores electronic data in a given format constituting electronic books to sell.

The storage 201 also stores a preview histories database 252 saving the histories of preview by the users on an electronic book basis. The preview histories database 252 is updated by the controller 203 as needed. The histories include, for example, a user ID identifying the previewing user, a page number the user previewed, details of operation by the previewing user, and a preview date/time, and the like.

The communicator 202 comprises a NIC (Network Interface Card), connects the distribution server 20 to the communication network 50, and communicates with the browsing devices 30.

The controller 203 comprises a CPU (Central Processing Unit), ROM (Read Only Memory), RAM (Random Access Memory), and the like, and controls the entire distribution server 20.

For example, receiving a request for purchasing an electronic book from a browsing device 30, the controller 203 conducts a payment procedure. Furthermore, receiving a request for browsing through an electronic book the user has purchased using a browsing device 30, the controller 203 acquires data constituting the electronic book from the electronic books database 251 and sends the data to the browsing device 30.

In this embodiment, the user can preview an electronic book before purchasing the electronic book. Receiving a request for previewing an electronic book from a browsing device 30, the controller 203 designates a previewable page of the whole electronic book. Then, the controller 203 acquires data constituting the designated page from the electronic books database 251 and sends the data to the browsing device 30. Details will be described later.

A conventional computer server, mainframe, cloud server, or the like can be used as the distribution server 20.

Figure 3:
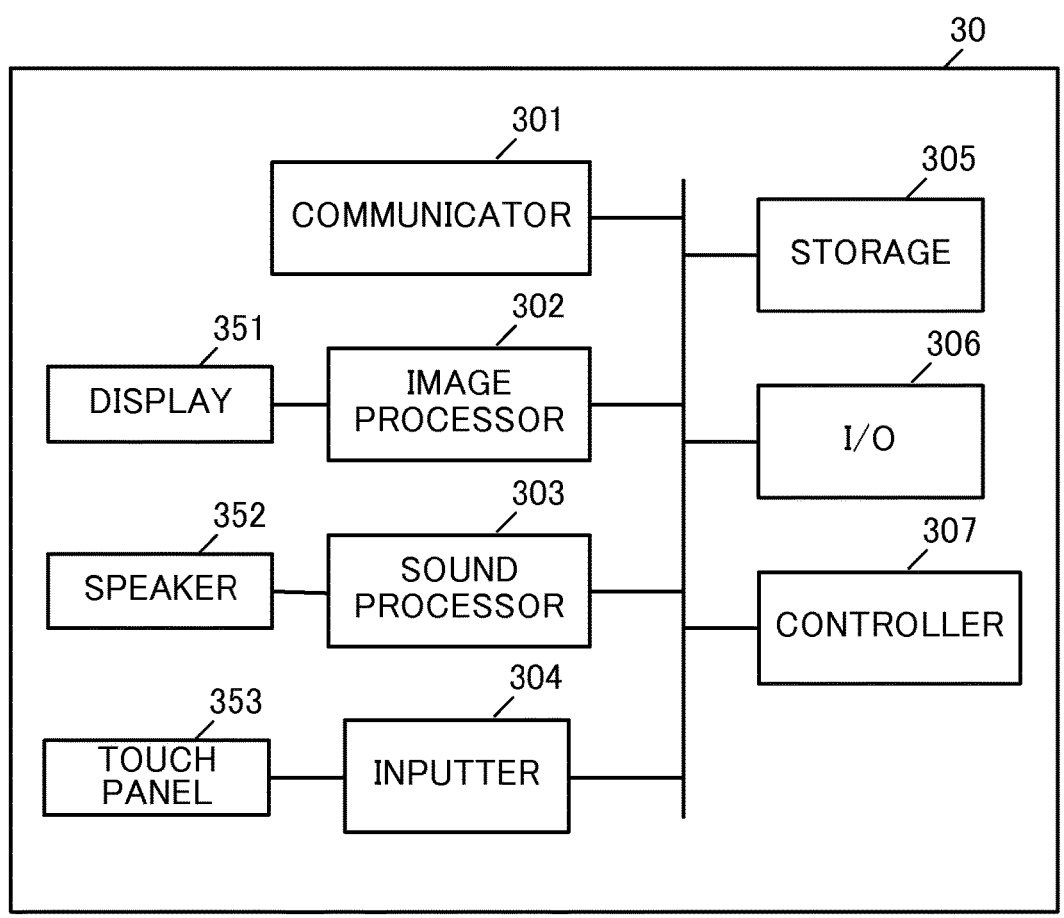
FIG. 3 is a diagram showing the configuration of the browsing devices.

The hardware configuration of the browsing devices 30 will be described hereafter using FIG. 3. The browsing device 30 comprises a communicator 301, an image processor 302, a sound processor 303, an I/O (Input/Output) 304, a storage 305, and a controller 306.

The communicator 301 comprises a NIC, connects the browsing device 30 to the communication network 50, and communicates with the distribution server 20.

The image processor 302 creates an electronic book image and displays the created image on a display 351. For example, the image processor 301 receives electronic data in a given format constituting an electronic book from the distribution server 20 via the communicator 301 and displays the electronic data on the display 351.

The sound processor 303 outputs sound from a speaker 352. When an electronic book contains sound data, the sound processor 303 acquires sound data from the distribution server 20 and reproduces the sound data.

The inputter 304 comprises a touch panel 353 and receives instructions from the user. The touch panel 353 is superimposed on the display 351.

The storage 305 comprises a storage device such as a hard disk, and stores an operating system controlling the browsing device 30, various kinds of programs, image data, sound data, text data, downloaded data constituting an electronic book, and the like.

The I/O 306 comprises an interface such as a USB (universal serial bus), and connects a memory card, and an external hard disk, or the like to the browsing device 30.

The controller 307 comprises a CPU and controls the entire browsing device 30. The controller 306 conducts a procedure to purchase an electronic book, a procedure to display an electronic book, and the like based on instructions received by the inputter 304. Details will be described later.

The preview procedure in which the distribution server 20 designates a page that the user is allowed to preview and allows the user to preview the page will be described hereafter. The distribution server 20 of this embodiment can successively update the page of a whole electronic book that the user is allowed to preview. The distribution server 20 optimizes the page that the user is allowed to preview based on the context of the past operation by the users who previewed and purchased the electronic book so as to induce interest in the users who have not purchased the electronic book.

When an electronic book contains a prologue and/or a table of contents, it is generally supposed to be good to allow the previewing user to browse through the prologue and/or table of contents in order to motivate the user to purchase. However, some electronic books contain no prologue or table of contents. Furthermore, allowing preview of some other pages in addition to the prologue and/or table of contents or instead of the prologue and/or table of contents may be more likely to induce interest in the user. The distribution server 20 of this embodiment successively designates a page that the user is allowed to preview in addition to the prologue and/or table of contents, and provides the page to the user. The preview procedure will be described hereafter on a case-by-case basis relative to whether an electronic book contains a prologue and/or a table of contents.

(1) Containing Both a Prologue and a Table of Contents:

For example, an electronic book contains a prologue on the first and second pages, a table of contents on the third page, and the body text on the fourth and subsequent pages, and the prologue and table of contents are set to be previewable pages. In other words, the first through third pages are previewable pages.

Receiving a request for previewing an electronic book from a browsing device 30, the controller 203 of the distribution server 20 acquires from the electronic books database 251 data constituting the page nearest to the beginning, namely the first page, among the previewable pages. Then, the controller 203 sends the acquired data constituting the first page to the browsing device 30. The controller 307 of the browsing device 30 receives the data constituting the first page from the distribution server 20 and reproduces the data.

Receiving a command to preview a subsequent page after reproducing the first page, the controller 307 of the browsing device 30 requests the distribution server 20 to send a subsequent previewable page. Requested to send a subsequent previewable page, the controller 203 of the distribution server 20 searches for previewable pages subsequent to the page sent earlier. In this case, the other previewable pages are the second and third pages. The controller 307 acquires from the electronic books database 251 data constituting a page nearest to the beginning, namely the second page, among the pages shown by the search results. Then, the controller 203 sends the acquired data constituting the second page to the browsing device 30. The controller 307 of the browsing device 30 receives the data constituting the second page from the distribution server 20 and reproduces the data.

Receiving a command to preview another subsequent page after reproducing the second page, the controller 203 of the browsing device 30 requests the distribution server 20 to send a subsequent previewable page. Requested to send a subsequent previewable page, the controller 203 of the distribution server 20 searches for previewable pages subsequent to the page sent earlier. In this case, the other previewable page is only the third page. The controller 307 acquires from the electronic books database 251 data constituting a page nearest to the beginning, namely the third page, among the pages shown by the search results. Then, the controller 203 sends the acquired data constituting the third page to the browsing device 30. The controller 307 of the browsing device 30 receives the data constituting the third page from the distribution server 20 and reproduces the data.

Receiving a command to preview another subsequent page after reproducing the third page, the controller 203 of the browsing device 30 requests the distribution server 20 to send a subsequent previewable page. Requested to send a subsequent previewable page, the controller 203 of the distribution server 20 searches for previewable pages subsequent to the page sent earlier. In this case, there is no other previewable page. Then, the controller 203 sends a previewable page sent earlier to the browsing device 30 again. The controller 307 acquires from the electronic books database 251 data constituting a page nearest to the beginning, namely the first page, among the previewable pages. Then, the controller 203 sends the acquired data constituting the first page to the browsing device 30. The controller 307 of the browsing device 30 receives the data constituting the first page from the distribution server 20 and reproduces the data.

Incidentally, the distribution server 10 can allow the user to preview the body text in addition to the prologue and table of contents. The procedure to designate a previewable page in the case of allowing preview of the body text will be described in the section "(4) Containing neither a prologue nor a table of contents."

(2) Of a Prologue and a Table of Contents, Containing Only a Prologue:

For example, an electronic book contains a prologue on the first and second pages and the body text on the third and subsequent pages, and the prologue is set as previewable pages.

Receiving a request for previewing an electronic book from a browsing device 30, the controller 203 of the distribution server 20 acquires from the electronic books database 251 data constituting a page nearest to the beginning, namely the first page, among the previewable pages. Then, the controller 203 sends the acquired data constituting the first page to the browsing device 30. The controller 307 of the browsing device 30 receives the data constituting the first page from the distribution server 20 and reproduces the data.

Receiving a command to preview a subsequent page after reproducing the first page, the controller 307 of the browsing device 30 requests the distribution server 20 to send a subsequent previewable page. Requested to send a subsequent previewable page, the controller 203 of the distribution server 20 searches for previewable pages subsequent to the page sent earlier. In this case, the other previewable page is only the second page. The controller 307 acquires from the electronic books database 251 data constituting a page nearest to the beginning, namely the second page, among the pages the search results show. Then, the controller 203 sends the acquired data constituting the second page to the browsing device 30. The controller 307 of the browsing device 30 receives the data constituting the second page from the distribution server 20 and reproduces the data.

Receiving a command to preview another subsequent page after reproducing the second page, the controller 307 of the browsing device 30 requests the distribution server 20 to send a subsequent previewable page. Requested to send a subsequent previewable page, the controller 203 of the distribution server 20 searches for previewable pages subsequent to the page sent earlier. In this case, there is no other previewable page. Then, the controller 203 sends a previewable page sent earlier to the browsing device 30 again. The controller 307 acquires from the electronic books database 251 data constituting a page nearest to the beginning, namely the first page, among the previewable pages. Then, the controller 203 sends the acquired data constituting the first page to the browsing device 30. The controller 307 of the browsing device 30 receives the data constituting the first page from the distribution server 20 and reproduces the data.

Incidentally, the distribution server 10 can allow the user to preview the body text in addition to the prologue. The procedure to designate a previewable page in the case of allowing preview of the body text will be described in the section "(4) Containing neither a prologue nor a table of contents."

(3) Of a Prologue and a Table of Contents, Containing Only a Table of Contents:

FIG. 4 shows an exemplary table of contents of an electronic book. The "table of contents" of an electronic book of this embodiment contains links 401 (five links 401A, 401B, 401C, 401D, and 401E in FIG. 4) enabling transfer to specified pages. As the user selects a link 401, the controller 307 of the browsing device 30 sends a request for acquiring the page presented by the selected link 401 to the distribution server 20.

For example, if the user selects the link 401A in FIG. 4, the browsing device 30 requests the distribution server 20 to send data constituting the fifth page presented by the link 401A. The distribution server 20 acquires from the electronic books database 251 the requested data constituting the fifth page and sends the data to the browsing device 30.

The controller 203 of the distribution server 20 records in the preview histories database 252 information presenting the requested page as a preview history in association with the user ID.

The controller 307 of the browsing device 30 acquires data constituting the requested page from the distribution server 20 and reproduces the data. The user can browse the page presented by the selected link.

An upper limit is set on the number of pages the user can preview. For example, if the upper limit is set to "5," the user can preview only up to five pages even if the electronic book has six or more pages.

Here, the preview histories database 252 and usage of the preview histories database 252 are described in detail. FIG. 5 shows exemplary preview histories recorded in the preview histories database 252. The preview histories database 252 of this embodiments stores, in association with the user ID of a previous previewing user, pages the user previewed, information presenting whether the user conducted an operation to zoom in or zoom out while the previewed page was displayed, the length of time the page was displayed, and information presenting whether the electronic book was purchased shortly after the page was previewed.

As the user enters a command to zoom in or zoom out the electronic book page while previewing it, the controller 307 of the browsing device 30 sends to the distribution server 20 information presenting the page that is displayed when the command to zoom in or zoom out is issued along with the user ID of the previewing user. The controller 203 of the distribution server 20 records in the preview histories database 252 information presenting the previewed page and information presenting a command to zoom in or zoom out being issued.

The controller 307 of the browsing device 30 measures the length of time until the user switches to previewing a next page since he started previewing a page or the length of time until the user finishes previewing a page since he started previewing the page, and sends information presenting the measured length of time to the distribution server 20 along with the user ID of the previewing user. The controller 203 of the distribution server 20 records the length of time measured by the browsing device 30 in the preview histories database 252.

The controller 203 of the distribution server 20 can record the date/time when data constituting a page is sent instead of recording the length of time measured by the browsing device 30 in the preview histories database 252. Then, the controller 203 can calculate the difference between the date/time when data constituting a first page is sent and the date/time when data constituting a second page is sent, and treat the calculated difference as the time spent for previewing the first page.

When the user purchased an electronic book after previewing a given page, the controller 307 of the browsing device 30 sends information presenting the last previewed page to the distribution server 20. The controller 203 of the distribution server 20 records in the preview histories database 252 information presenting the last previewed page and information presenting the electronic book being purchased.

The controller 307 of the browsing device 30 can send information presenting all pages previewed before the purchase to the distribution server 20 in addition to information presenting the last previewed page. The controller 203 of the distribution server 20 can record in the preview histories database 252 information presenting the pages previewed by the user who purchased the electronic book and information presenting the electronic book being purchased.

As described above, the preview histories database 252 accumulates history of operation to zoom in or zoom out conducted by the previewing user, history of the length of time of preview by the user, and history of purchase or non-purchase after the preview.

As the number of times an electronic book is previewed increases, the pages of which the number of times of being purchased after being previewed tends to be high will be known based on the preview histories stored in the preview histories database 252. Therefore, the distribution server 20 can narrow down the pages that future previewing users (the second user) who have not previewed are allowed to preview based on the context of operation by the past previewing users (the first user) during their preview so that the electronic book will be purchased more.

In other words, the distribution server 20 provides the first user with one or more pages among the pages presented by the designated candidates (the first candidate pages) in a previewable manner. Then, the distribution server 20 designates candidate pages that the second user is allowed to preview based on the context of operation by the first user and the first candidate pages. Then, the distribution server 20 provides the second user with one or more pages among the pages presented by the designated candidates (the second candidate pages) in a previewable manner. The pages that the second user is allowed to preview are successively optimized based on the context of operation by the first user.

If the number of times of being purchased soon after a given specific page is previewed is relatively higher than the numbers of times of being purchased immediately after other pages are previewed, supposedly, previewing that specific page was the key to the purchase for the previewing user. Therefore, presumably, allowing future previewing users to preview that specific page increases the possibility of the electronic book being purchased. The controller 203 of the distribution server 20 designates the page of which the number of times of being purchased immediately after being previewed by the first user is high as a candidate page that the second user is allowed to preview.

Furthermore, if a given specific page is zoomed in or zoomed out while being previewed, supposedly, the specific page may be a page particularly interesting to the user. Therefore, presumably, allowing future previewing users to preview the specific page increases the users' motivation to purchase. The controller 203 of the distribution server 20 designates the page that was zoomed in or zoomed out by the first user as a candidate page that the second user is allowed to preview.

An event of being purchased soon after being previewed and an event of being zoomed in or zoomed out while being previewed are compatible. The controller 203 of the distribution server 20 can add 1 to a weight coefficient associated with a previewed page when a purchase is made soon after the page is previewed, and can add 1 to the weight coefficient associated with a previewed page when the page is zoomed in or zoomed out while being previewed. The weight coefficient is set to "2" if the page is zoomed in or zoomed out and a purchase is made soon afterward. The controller 203 can weigh each candidate page based on the magnitude of the calculated weight coefficient. The controller 203 can increase the probability of selecting as the weight coefficient is greater.

Furthermore, if the length of time that a given specific page is displayed is longer than the lengths of time other pages are displayed, supposedly, that specific page is a page particularly inducing interest in the user. Therefore, presumably, allowing future previewing users to preview that specific page increases the users' motivation to purchase. The controller 203 of the distribution server 20 designates the page of which the length of time of being previewed by the first user (the length of time of being displayed by the browsing device 30) is relatively longer than other pages as a candidate page that the second user is allowed to preview.

Each of the designated candidate pages are pages the distribution server 20 allows the user to preview when the user previews without using the table of contents. When the user does not preview the table of contents first in spite of the presence of a table of contents, the controller 203 of the distribution server 20 selects one page among the designated candidate pages. Then, the controller 203 acquires from the electronic books database 251 data constituting the selected page, and sends the acquired data to the browsing device 30. As a result, the user of the browsing device 30 previews a page that is, the distribution server 20 presumed, likely to induce interest in the user.

The candidate pages designated as described above can also be the pages that the user is allowed to preview of an electronic book having neither a table of contents nor a prologue.

The controller 203 of the distribution server 20 can randomly select any one page among the designated candidate pages. When the candidate pages are associated with weight coefficients, the controller 203 can increase the probability of selecting as the weight coefficient is higher.

The controller 203 of the distribution server 20 can select one page in the order of nearness to the first page from the nearest among the designated candidate pages.

(4) Containing Neither a Prologue Nor a Table of Contents:

When an electronic book contains neither a prologue nor a table of contents, the controller 203 of the distribution server 20 designates pages that the second user (future previewing users) is allowed to preview based on the preview histories of the first user (past previewing users) stored in the preview histories database 252. The controller 203 extracts candidate pages that are presumably likely to induce interest in the second user and allows the user to preview any page among the extracted candidate pages.

The controller 203 of the distribution server 20 extracts candidate pages that the second user is allowed to preview from the whole electronic book and selects any among the extracted candidate pages. Then, the controller 203 provides the selected candidate page to the second user in a previewable manner.

More specifically, the controller 203 designates the pages for which the number of times of being purchased by the first user soon after being previewed by the first user is high as candidate pages that the second user is allowed to preview based on the first user's preview histories stored in the preview histories database 252.

For example, as the number of times of being purchased soon after a given page is previewed is higher, presumably, previewing that page was highly possibly the key to the purchase for the user. Then, the controller 203 searches for information presenting the number of times of being purchased in the preview histories stored in the preview histories database 252. The controller 203 designates the pages of which the number of times of being purchased soon after being previewed by the first user in the past is higher than a given reference value as candidate pages that the second user is allowed to preview. The reference value is set on an arbitrary basis.

The controller 203 randomly selects any page among the designated candidate pages and sets the page as the page that the second user is allowed to preview.

The controller 203 can set the probability of selecting higher as the number of times of being purchased soon after being previewed by the first user is higher, and randomly make a selection among the candidate pages using the set probability.

Furthermore, if a given page is zoomed in or zoomed out while being previewed, presumably, the user has relatively higher interest in the page than in other pages that were not zoomed in or zoomed out. Then, the controller 203 searches for information presenting an operation to zoom in or zoom out in the preview histories stored in the preview histories database 252. Then, the controller 203 can designate the pages that were zoomed in or zoomed out by the first user while being previewed as candidate pages that the second user is allowed to preview.

Furthermore, as the length of time a given page is displayed is longer, presumably, the user is highly interested in the page. Then, the controller 203 searches for information presenting the length of time a page is displayed in the preview histories stored in the preview histories database 252. Then, the controller 203 designates the pages of which the length of time of being displayed while being previewed by the first user was longer than a given reference time as candidate pages that the second user is allowed to preview. The reference time is set on an arbitrary basis.

The controller 203 can set the probability of selecting higher as the length of time of being displayed while being previewed by the first user is longer, and randomly make a selection among the candidate pages using the set probability.

However, even if the length of time of being displayed is longer, it cannot always be said depending on the posted contents of a page that the degree of interest is high. Generally, it takes more time to read a page containing a large number of characters than to read a page containing many images. Then, the controller 203 can set the reference time differently depending on the posted contents of a page.

For example, the controller 203 sets a first reference time for pages containing only text, and sets a second reference time, which is shorter than the first reference time, for pages containing at least one artwork or graphic in addition to text. The controller 203 also sets a third reference time, which is shorter than the second reference time, for pages containing only artworks and/or graphics without text. Then, the controller 203 designates the pages of which the length of time of being displayed is longer than the set reference time as candidate pages for preview.

The controller 203 can narrow down further the candidate pages based on attributes of the user after designating the candidate pages based on the number of times of being purchased and/or the presence/absence of operation to zoom in or zoom out and/or the length of time of being displayed.

For example, the controller 203 can classify the preview histories recorded in the preview histories database 252 by the first user's age, and set candidate pages for each of the classified ages. Then, the controller 203 can set suitable candidate pages according to the second previewing user's age. In this way, it is possible to narrow down to candidate pages possibly inducing interest in children or to candidate pages possibly inducing interest in adults separately.

The controller 203 can classify the preview histories recorded in the preview histories database 252 by the user's gender, and set candidate pages for each of the classified genders. Then, the controller 203 can set suitable candidate pages according to the previewing user's gender.

The controller 203 can classify the first user's preview histories recorded in the preview histories database 252 by the first user's past purchase records, and set candidate pages for each of the classified groups of purchase records. Then, the controller 203 can set suitable candidate pages according to the purchase records of the second, or future previewing, user. The purchase records include the field, quantity, price, and the like of the electronic books the user purchased in the past.

The proceeding of the designation procedure for the distribution server 20 to designate pages that the user is allowed to preview will be described hereafter using the flowchart of FIG. 6. Here, the preview procedure will be described using a case in which an electronic book contains neither a table of contents nor a prologue.

First, the controller 307 of a browsing device 30 receives a request for previewing an electronic book from a second user (a future previewing user). The controller 307 sends the request for previewing an electronic book to the distribution server 20 along with the user ID of the second user. The controller 203 of the distribution server 20 receives the request for previewing an electronic book and the user ID from the browsing device 30 (Step S601).

The controller 203 of the distribution server 20 determines whether a given or higher number of preview histories of the first user (past previewing users) are recorded in the preview histories database 252 (Step S602).

If the number of preview histories is equal to or higher than a given number (Step S602; YES), the controller 203 designates candidate pages that the second user is allowed to preview based on the preview histories recorded in the preview histories database 252 (Step S603).

For example, the controller 203 extracts from the whole electronic book the pages of which the number of times of being purchased soon after being previewed by the first user is higher than a given value, the pages that were zoomed in or zoomed out while being previewed by the first user, the pages of which the length of time of being displayed by the browsing device 30 used by the first user is longer than a reference time, and the like. Any number of pages can be extracted. Then, the controller 203 designates the extracted pages as candidate pages that the second user is allowed to preview. Typically, multiple candidate pages are designated and any of the multiple candidate pages becomes a page for the second user to preview.

If the number of preview histories is less than a given number (Step S602; NO), the controller 203 designates all pages of the electronic book as candidate pages that the second user is allowed to preview (Step S604). In other words, if sufficient preview histories for deducing pages the user is highly interest in are not recorded, candidate pages are designated without using the preview histories.

In this embodiment, all pages of an electronic book are designated as candidate pages in the Step S604. However, if there are specific pages that the seller does not want to be previewed such as those of the climax of a story, those specific pages can be excluded from the candidate pages. Possibly, definition data defining specific pages to exclude are pre-stored in the storage 201 and the controller 203 excludes the specific pages from candidate pages based on the definition data.

The controller 203 of the distribution server 20 selects any one page among the candidate pages set in the Step S603 or Step S604 as a page that the second user is allowed to preview (Step S605). For example, the controller 203 randomly selects one page among the all candidate pages.

The controller 203 can weigh the probability of a candidate page being selected according to the number of times of being purchased soon after being previewed by the first user, the number of times of being zoomed in or zoomed out while being previewed by the first user, or the length of time of being displayed by the browsing device 30 used by the first user. In such a case, as the number of times of being purchased soon after being previewed by the first user is higher, the probability of being selected is increased. As the number of times of being zoomed in or zoomed out while being previewed by the first user is higher, the probability of being selected is increased. As the length of time of being displayed by the browsing device 30 used by the first user is longer, the probability of being selected is increased.

The controller 203 acquires data constituting the page selected in the Step S605 from the electronic books database 251, and sends the data to the browsing device 30 (Step S606).

The controller 307 of the browsing device 30 receives the data constituting the page that the second user is allowed to preview from the distribution server 20, and reproduces the data. The second user previews the electronic book.

If an operation to zoom in or zoom out is conducted by the second user during his preview, the controller 307 of the browsing device 30 sends to the distribution server 20 a notice of an operation to zoom in or zoom out being conducted by the second user during his preview (a notice presenting the context of operation). The controller 203 of the distribution server 20 receives the notice presenting the context of operation by the second user from the browsing device 30.

Furthermore, the controller 307 of the browsing device 30 measures the length of time one page is displayed, and notifies the distribution server 20 of the length of time. The controller 203 of the distribution server 20 receives a notice presenting the length of time of being displayed from the browsing device 30. This notice presenting the length of time of being displayed is also contained in the above notice presenting the context of operation.

The controller 203 updates the preview histories stored in the preview histories database 252 based on the selection results in the Step S605 and/or the context of operation by the second user during his preview (Step S607).

More specifically, the controller 203 adds a new record in which the user ID of the second user is associated with information presenting the previewed page in the preview histories database 252 shown in FIG. 5.

Furthermore, in the case of having received a notice of an operation to zoom in or zoom out being conducted by the second user during his preview, the controller 203 records the event that an operation to zoom in or zoom out is conducted by the second user during his preview in the preview histories database 252.

Furthermore, in the case of having received a notice presenting the length of time one page is displayed, the controller 203 records information presenting the length of time one page is displayed in the preview histories database 252.

Then, the controller 203 of the distribution server 20 determines whether a command to purchase the electronic book previewed by the second user is received from the browsing device 30 (Step S608).

If a command to purchase the electronic book previewed by the second user is received from the browsing device 30 (Step S608; YES), the controller 203 executes the payment procedure (Step S609).

More specifically, the controller 307 of the browsing device 30 receives input of a credit card number and contractor name from the second user, and sends the entered credit card number and contractor name to the distribution server 20 along with the notice of purchase of the electronic book. The controller 203 of the distribution server 20 communicates with a payment-processing server (not shown) of the credit card company and makes a request to process the payment with the received credit card number and contractor name. If the credit card number and contractor name are valid, the controller 203 of the distribution server 20 receives a notice of successful payment process. The controller 203 of the distribution server 20 notifies the browsing device 30 of completion of the payment process. The browsing device 30 displays completion of the payment process on the display 351. Then, the browsing device 30 downloads all data constituting the electronic book, stores the data in the storage 305, and reproduces the data.

The controller 203 of the distribution server 20 updates the preview histories database 252 (Step S610). The controller 203 records information showing the event that the second user purchased the electronic book he previewed in the preview histories database 252.

On the other hand, if no command to purchase the electronic book previewed by the second user is received from the browsing device 30 (Step S608; NO), the controller 203 determines whether the number of pages previewed by the second user has reached a given upper limit (Step S611).

If the number of pages previewed by the second user has reached a given upper limit (Step S611; YES), the controller 203 ends the preview procedure. If the number of pages previewed by the second user has not reached a given upper limit (Step S611; NO), the controller 203 returns to the processing of the Step S601.

Incidentally, if the controller 203 does not receive a command to purchase the electronic book in the Step S608 and receives a preview request in the Step S601, in other words if the second user continues to preview without purchasing the electronic book, the controller 203 records in the preview histories database 252 information showing the event that the second user did not purchase the electronic book after previewing the page selected in the Step S605.

The preview histories recorded in the preview histories database 252 are used upon receiving a request for previewing the electronic book from another user next time to designate pages that the other user is allowed to preview. As the preview histories are accumulated in the preview histories database 252, the pages that are likely to induce interest in the previewing user are provided. As the number of times of preview by the user increases, the candidate pages are narrowed down so as to increase the previewing user's motivation to purchase.

In this embodiment, if a given or higher number of preview histories are not recorded in the preview histories database 252, all pages are set as candidate pages. Therefore, soon after an electronic book is released, the user is free to browse all pages of the electronic book until the number of previewed pages has reached a given upper limit. As a given or higher number of preview histories are recorded in the preview histories database 252, the candidate pages that subsequent users are allowed to preview among all pages are narrowed down. As the preview histories stored in the preview histories database 252 increase, the candidate pages that the subsequent users are allowed to preview are further narrowed down. The pages that the subsequent users are allowed to preview are gradually narrowed down and the candidate pages are reduced in number and optimized.

According to this embodiment, the distribution server 20 can allow the user to preview pages that increase the user's motivation to purchase. Furthermore, the distribution server 20 can optimize the pages to be previewed by the user. The sellers have the advantage that a larger number of electronic books are expected to be purchased by the users. Furthermore, the purchasers have the advantage that they can determine whether to purchase an electronic book more efficiently.

The flowchart of FIG. 6 presents the preview procedure to allow preview of an electronic book containing neither a table of contents nor a prologue. However, a similar procedure can be used to allow the user to preview an electronic book containing a table of contents or to preview an electronic book containing a prologue.

For example, in the case of allowing the user to preview an electronic book containing a table of contents, the distribution server 20 can first allow the user to preview the table of contents page and preview a given number of pages freely, and then allow the user to preview as designated by the distribution server 20 in the above-described preview procedure. In this way, the distribution server 20 can give the user a freedom of preview to some extent and allow the user to preview pages that increases motivation to purchase.

The controller 203 can exclude the table of contents from the candidate pages when the number of candidate pages that the user is allowed to preview becomes equal to or less than a given number, in other words when the candidate pages are sufficiently narrowed down.

In the case of allowing the user to preview an electronic book containing a prologue, similarly, the distribution server 20 can first allow the user to preview the prologue page and preview a given number of pages freely, and then designate the previewable pages in the above-described preview procedure.

Embodiment 2

Another embodiment will be described hereafter. This embodiment is an modified embodiment of the method of narrowing down the candidate pages.

The controller 203 of the distribution server 20 assigns a score to each candidate page based on the preview histories stored in the preview histories database 252. Then, the controller 203 designates a given number of top-ranking pages to which higher scores are assigned as candidate pages.

First, the controller 203 sets the scores assigned to all pages of an electronic book to an initial value (for example, zero) and starts selling the electronic book.

The controller 203 adds a first value to the score of a page with which the user starts previewing.

The controller 203 adds a second value to the score of a page previewed by the user regardless of whether the page is the first preview page.

If an operation to zoom in or zoom out a page is entered while the page is previewed by the user, the controller 203 adds a third value to the score of the page.

If the electronic book is purchased by the user, the controller 203 adds a fourth value to the score of the page previewed most recently before the purchase.

The controller 203 can add the fourth value to the scores of the pages previewed by the user who purchased the electronic book regardless of whether the preview is most recently before the purchase.

The first, second, third, and fourth values are each any positive value and predetermined by the distribution server 20.

Under the above addition rules, the pages constituting an electronic book are each associated with a score calculated based on the preview histories.

Incidentally, the distribution server 20 can adopt only some of the above addition rules or define other addition rules.

Then, the controller 203 sets a threshold that is lowered as the number of previewing users increases. Then, the controller 203 extracts pages as many as the threshold in the descending order of score from the highest. The controller 203 designates the extracted, higher score pages as candidate pages to be previewed from then on.

Since the threshold is lowered as the number of previewing users increases, the number of designated candidate pages is reduced as the number of previewing users increases. In other words, as the preview time is delayed, the candidate pages are narrowed down to pages more likely to provoke interest based on the past previewing users' action and/or operation. The user who previews at a later time is provided with pages that are likely to lead to purchase.

FIG. 7 shows a distribution of page numbers and exemplary scores. As a first step, the controller 203 sets a threshold T1 for the number of extractions. The controller 203 extracts T1 higher score pages. In other words, the pages having a score of P1 or higher are extracted. For example, five pages having page numbers N, N+1, N+2, N+3, and N+4 are candidate pages. Having a score lower than P1, the page having a page number N+5 is not a candidate page.

Then, as the number of previewing users increases, as a second step, the controller 203 sets a threshold T2 for the number of extractions. The controller 203 extracts T2, which is fewer than T1, higher score pages. In other words, the pages having a score of P2 or higher are extracted. For example, four pages having page numbers N, N+1, N+2, and N+3 are candidate pages. Having a score lower than P2, the page having a page number N+4 is excluded from the candidate pages.

As the number of previewing users further increases, as a third step, the controller 203 sets a threshold T3 for the number of extractions. The controller 203 extracts T3, which is fewer than T2, higher score pages. In other words, the pages having a score of P3 or higher are extracted. For example, three pages having page numbers N, N+1, and N+2 are candidate pages. Having a score lower than P3, the page having a page number N+3 is excluded from the candidate pages. In this way, the candidate pages are gradually reduced in number and narrowed down.

Incidentally, instead of calculating the scores associated with all pages of an electronic book, the controller 203 can calculate the scores associated with multiple first candidate pages, namely the candidate pages that were provided to the first user or past previewing users in a previewable manner. In this way, the pages for which the score is calculated are narrowed down and gradually reduced in number, whereby the processing workload of the browsing device 30 can be reduced.

Also in this embodiment, the controller 203 can set all pages of an electronic book as candidate pages that the second user is allowed to preview when the number of preview histories recorded in the preview histories database 252 is less than a given number.

Alternatively, the controller 203 can allow all pages to be previewed freely without setting an upper limit on the number of previewable pages when the number of preview histories recorded in the preview histories database 252 is less than a given number. Then, the controller 203 can set an upper limit on the number of previewable pages when the number of preview histories recorded in the preview histories database 252 becomes equal to or higher than a given number.

Before sufficient preview histories are gathered, pages provoking interest may not always be provided even if the candidate pages are designated based on the preview histories recorded in the preview histories database 252. Then, the distribution server 20 allows the user to browse all pages freely and collects samples of history of operation to zoom in or zoom out, history of display times of pages, sales history, and the like until sufficient preview histories are gathered. In this way, it is possible to give the user a motivation to preview at an earlier time and collect preview history samples efficiently.

Instead of setting an upper limit on the number of previewable pages while the number of preview histories is less than a given number, the controller 203 can set an upper limit on the number of previewable pages within a given time period since the start of selling.

Embodiment 3

Another embodiment will be described hereafter. In this embodiment, masking is conducted on a picture, graphic, and/or the like on a previewable page.

If a candidate page contains a picture or graphic, the controller 203 conducts image processing such as placing a mosaic or a given filter on the display region of the picture, graphic, or the like, or reducing the resolution of the display region.

Furthermore, the controller 203 increases the masking rate as the number of previewing users increases. In other words, as the number of previewing users increases, the previewing user has difficulty in viewing the picture or graphic.

Immediately after the start of selling an electronic book, the controller 203 displays the pages of the electronic book in a first form. In other words, as a first step, the controller 203 places no mask on the picture, graphic, and/or the like, or minimizes the masking rate. The previewing user can browse a clear picture, graphic, and/or the like.

When the number of preview histories stored in the preview histories database 252 is low, the picture, graphic, and/or the like is clearly displayed. Therefore, it is possible to give the user a motivation to preview at an earlier time and collect preview history samples efficiently.

As the number of previewing users increases, the controller 203 displays the pages of the electronic book in a second form. In other words, as a second step, the controller 203 increases the masking rate. The previewing user cannot browse the clear picture, graphic, and/or the like in the first step. Instead, the previewing user can browse a slightly less clear picture, graphic, and/or the like.

When the number of previewing users further increases, similarly, the rate of masking the picture, graphic, and/or the like is increased and their clearness is gradually reduced.

As the preview time is late, the clearness of the picture, graphic, and/or the like deteriorates. The user who previews at a later time is provided with pages that are more likely to induce interest; however, the pictures, graphics, and/or the like on the pages are difficult to view. Therefore, it is possible to give the user who previews at a later time a higher motivation to purchase.

The masking is not restricted to mosaicking, reduced resolution, or filtering. For example, the controller 203 can reduce the size of the picture, graphic, or the like as the number of previewing users increases. Alternatively, the controller 203 can reduce the number of colors of the picture, graphic, or the like as the number of previewing users increases.

The controller 203 can mask a portion of a picture on a page that is matched with a specific shape pattern such as a region similar to the shape of a face or a region similar to the shape of an eye. The controller 203 can identify the specific shape pattern by matching between a given template image and an image, pattern analysis, spatial frequency analysis, or the like.

In this embodiment, the controller 203 does not need to narrow down the candidate pages based on the preview histories stored in the preview histories database 252. In other words, the controller 203 can set all pages as previewable targets and mask the picture, graphic, and/or the like contained in all pages.

However, this embodiment can readily be combined with Embodiment 1. In other words, the controller 203 can narrow down the candidate pages based on the preview histories stored in the preview histories database 252 and mask the picture, graphic, and/or the like contained in the candidate pages.

Furthermore, this embodiment can readily be combined with Embodiment 2. In other words, the controller 203 sets a threshold T1 for the number of extractions, and places no mask on the picture, graphic, and/or the like or minimizes the masking rate. Then, when the number of preview histories has reached a first given number, the controller 203 sets a threshold T2 for the number of extractions and increases the masking rate. Furthermore, when the number of preview histories has reached a second given number, the controller 203 sets a threshold T3 for the number of extractions and further increases the masking rate. In this way, the effect of increasing the user's motivation to purchase is enhanced.

The present disclosure is not confined to the above-described embodiments and various modifications and application are available. Furthermore, the components of the above-described embodiments can be combined on an arbitrary basis.

In the above-described embodiments, when an electronic book contains a table of contents, with a link 401 being selected, the controller 203 of the distribution server 20 allows the user to preview a page presented by the link 401. However, a limitation can be set on the number of people who can preview a desired page via the link 401 or the time period during which people can preview a desired page via the link 401.

For example, immediately after the start of selling an electronic book, the number of preview histories recorded in the preview histories database 252 is low. Therefore, the controller 203 allows the user to preview via the link 401 until a sufficient number of preview histories for designating previewable pages are gathered. In other words, the controller 203 allows the user to use the link 401 in a given time period immediately after the start of selling an electronic book, and gathers a sufficient number of samples for deducing.

After a sufficient number of preview histories are gathered, the controller 203 does not allow preview via the link 401. The controller 203 sets a page presented by a link 401 selected by the user during the given time period as a candidate page that is previewed by other users after the given time period is over. In this way, the distribution server 20 can efficiently optimize the page that the user is allowed to preview.

The controller 203 of the distribution server 20 can place a given mask image on an artwork or graphic on a page that the user is allowed to preview so that nobody but the purchaser can view the artwork or graphic. In this way, it is possible to further increase the user's motivation to purchase.

In the above-described embodiments, the controller 203 of the distribution server 20 distributes an electronic book data to a browsing device 30 page by page. However, the controller 203 can first send to a browsing device 30 all pages of the electronic book data and send to the browsing device 30 a setting file defining which pages are previewable.

In such a case, the controller 307 of the browsing device 30 displays the pages that are previewable according to the setting file among the all pages of the electronic book received, and does not display the pages that are not previewable according to the setting file. The controller 307 displays a page specified by the user if the page is a previewable page, and displays a message indicating "not previewable" if the page is not a previewable page.

The programs for allowing a computer to operate as the entirety or a part of the above-described electronic book system 1 can be saved and distributed on a computer readable non-transitory recording medium such as a memory card, CD-ROM, DVD, MO (magneto-optical disk), and installed on another computer so that the computer operates as the above-described means or executes the above-described procedures.

Furthermore, the programs can be saved on a disc device or the like of a server unit on the Internet and, for example, superimposed on carrier waves and downloaded on a computer.

The present disclosure can provide pages that presumably the user who previews the electronic book is highly interested in so as to increase the user's motivation to purchase.

REFERENCE SIGNS LIST

1 Electronic book system
20 Distribution server 30, 30A, 30B, 30C Browsing device
50 Communication network
201 Storage
202 Communicator
203 Controller
251 Electronic books database
252 Preview histories database
301 Communicator
302 Image processor
303 Sound processor
304 Inputter
305 Storage
306 I/O
307 Controller
351 Display
352 Speaker
353 Touch panel
401, 401A, 401B, 401C, 401D, 401E Link

The invention claimed is:

1. An electronic book system, comprising:
at least one memory configured to store computer program code; and
at least one processor configured to access said at least one memory, read said computer program code, and operate as instructed by said computer program code, said computer program code including:
acquisition code configured to cause at least one of said at least one processor to acquire a context of operation by a first user who is provided with first candidate pages contained in an electronic book in a previewable manner;
designation code configured to cause at least one of said at least one processor to designate at least one second candidate page based on the acquired context of operation and the first candidate pages; and
provider code configured to cause at least one of said at least one processor to provide the designated second candidate page contained in the electronic book to a second user in a preview able manner, wherein
the context of operation by the first user includes information presenting whether the electronic book is purchased by the first user after at least one of the first candidate pages is previewed by the first user,
the designation code is further configured to cause at least one of said at least one processor to designate the page that is previewed immediately before the electronic book is purchased by the first user as the second candidate page,
the context of operation by the first user includes information presenting whether an operation to zoom in or zoom out is conducted on a page previewed by the first user, and
the designation code is further configured to cause at least one of said at least one processor to designate the page on which the operation to zoom in or zoom out is conducted by the first user, as the second candidate page.

2. The electronic book system according to claim 1, wherein
the designation code is further configured to cause at least one of said at least one processor to extract at least one first candidate page among the first candidate pages based on the acquired context of operation and designates the extracted first candidate page as the second candidate page.

3. The electronic book system according to claim 1, wherein
the designation code is further configured to cause at least one of said at least one processor to designate a table of contents page contained in the electronic book and the first page of each item listed on the table of contents as the second candidate page.

4. The electronic book system according to claim 1, wherein
the context of operation by the first user includes the length of time a page previewed by the first user is displayed, and
the designation code is further configured to cause at least one of said at least one processor to designate the page of which the length of time of being displayed is relatively longer as the second candidate page.

5. The electronic book system according to claim 1, wherein
the designation code is further configured to cause at least one of said at least one processor to:
set an upper limit on the number of pages that the second user is allowed to preview among the designated second candidate pages,
allow previewing of the designated second candidate page when the number of pages previewed by the second user has not reached the upper limit, and
not allow previewing of the designated second candidate page when the number of pages previewed by the second user has reached the upper limit.

6. The electronic book system according to claim 1, further comprising:
a storage configured to store the acquired context of operation by the first user, wherein
the designation code is further configured to cause at least one of said at least one processor to designate the second candidate page based on the context of operation stored in the storage and the first candidate pages.

7. The electronic book system according to claim 5, wherein
the designation code is further configured to cause at least one of said at least one processor to designate:
all pages contained in the electronic book as the second candidate page when the number of contexts of operation by the first user stored in a storage is less than a given number, and
the second candidate page based on the context of operation stored in the storage and the first candidate pages when the number of contexts of operation by the first user stored in the storage is equal to or higher than the given number.

8. The electronic book system according to claim 5, wherein
the designation code is further configured to cause at least one of said at least one processor to designate:
all pages contained in the electronic book as the second candidate page when the electronic book is previewed within a given time period since the start of selling the electronic book, and
the second candidate page based on the context of operation stored in a storage and the first candidate pages when the electronic book is previewed after elapse of the given time period.

9. The electronic book system according to claim 5, wherein
the storage is further to store attribute information of the first user, and
the designation code is further configured to cause at least one of said at least one processor to designate the second candidate page based on the context of operation by the first user who has attribute information matched with attribute information of the second user and the first candidate pages.

10. An electronic book system, comprising:
at least one memory configured to store computer program code; and
at least one processor configured to access said at least one memory, read said computer program code, and operate as instructed by said computer program code, said computer program code including:
acquisition code configured to cause at least one of said at least one processor to acquire a context of operation by a first user who is provided with first candidate pages contained in an electronic book in a previewable manner;
designation code configured to cause at least one of said at least one processor to designate at least one second candidate page based on the acquired context of operation and the first candidate pages;
provider code configured to cause at least one of said at least one processor to provide the designated second candidate page contained in the electronic book to a second user in a preview able manner; and
a storage configured to store the acquired context of operation by the first user, wherein the designation code is further configured to cause at least one of said at least one processor to:
calculate a score for each of the first candidate pages based on the context of operation stored in the storage and the first candidate pages,
set a threshold that is lowered as the number of users who previewed the electronic book increases, and
designate pages as many as indicated by the threshold in the descending order of the calculated score from the highest among the first candidate pages as the second candidate page.

11. The electronic book system according to claim 1, wherein
the acquisition code is further configured to cause at least one of said at least one processor to acquire the context of operation by the first user who is provided with the first candidate pages in a first form of previewable manner,
the designation code is further configured to cause at least one of said at least one processor to designate a second form based on the acquired context of operation, and
the provider code configured is further configured to cause at least one of said at least one processor to provide the second candidate page to the second user in the designated second form of preview able manner.

12. An electronic book system, comprising:
at least one memory configured to store computer program code; and
at least one processor configured to access said at least one memory, read said computer program code, and operate as instructed by said computer program code, said computer program code including:
acquisition code configured to cause at least one of said at least one processor to acquire a context of operation by a first user who is provided with candidate pages contained in an electronic book in a first form of previewable manner;
designation code configured to cause at least one of said at least one processor to designate a second form based on the acquired context of operation; and
provider code configured to cause at least one of said at least one processor to provide the candidate pages contained in the electronic book to a second user in the designated second form of previewable manner, wherein
the candidate pages provided in the second form of previewable manner are less clear than the candidate pages provided in the first form of previewable manner,
the context of operation by the first user includes information presenting whether or not the electronic book is purchased by the first user after a candidate page is previewed by the first user, and
the designation code is further configured to cause at least one of said at least one processor to designate the page that is previewed immediately before the electronic book is purchased by the first user as a second candidate page.

13. An electronic book provision method, comprising:
acquiring a context of operation by a first user who is provided with first candidate pages contained in an electronic book in a previewable manner;
designating at least one second candidate page based on the acquired context of operation and the first candidate pages; and
providing the designated second candidate page contained in the electronic book to a second user in a previewable manner, wherein
the context of operation by the first user includes information presenting whether the electronic book is purchased by the first user after at least one of the first candidate pages is previewed by the first user, and
designating the page that is previewed immediately before the electronic book is purchased by the first user as the second candidate page,
the context of operation by the first user includes information presenting whether an operation to zoom in or zoom out is conducted on a page previewed by the first user, and
the designating includes designating the page on which the operation to zoom in or zoom out is conducted by the first user, as the second candidate page.

14. An electronic book provision method, comprising:
acquiring a context of operation by a first user who is provided with first candidate pages contained in an electronic book in a previewable manner;
designating at least one second candidate page based on the acquired context of operation and the first candidate pages;
providing the designated second candidate page contained in the electronic book to a second user in a previewable manner; and
storing the acquired context of operation by the first user; and wherein
calculating a score for each of the first candidate pages based on the context of operation stored in a storage and the first candidate pages, setting a threshold that is lowered as the number of users who previewed the electronic book increases, and
designating pages as many as indicated by the threshold in the descending order of the calculated score from the highest among the first candidate pages as the second candidate page.

15. A non-transitory computer readable medium storing thereon an information processing program, the information processing program causing a computer to perform the method of claim 13.

16. A non-transitory computer readable medium storing thereon an information processing program, the information processing program causing a computer to perform the method of claim 14.

* * * * *